July 13, 1965  E. S. WIESZECK  3,194,073
MULTIMETER METERING APPARATUS
Filed June 2, 1961  3 Sheets-Sheet 1

INVENTOR
Emil S. Wieszeck
BY
Munson T. Hamilton
ATTORNEY

July 13, 1965 E. S. WIESZECK 3,194,073
MULTIMETER METERING APPARATUS
Filed June 2, 1961 3 Sheets-Sheet 2

INVENTOR
Emil S. Wieszeck
BY
ATTORNEY

July 13, 1965  E. S. WIESZECK  3,194,073
MULTIMETER METERING APPARATUS
Filed June 2, 1961  3 Sheets-Sheet 3
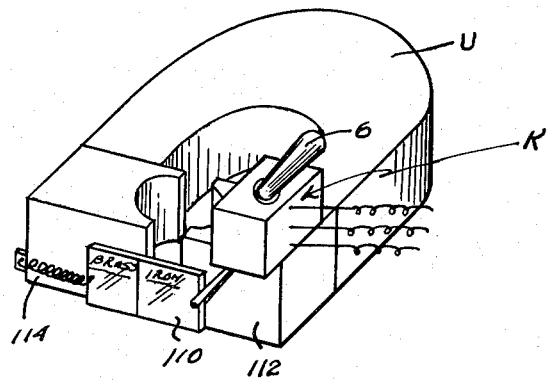
FIG. 6.
FIG. 7.
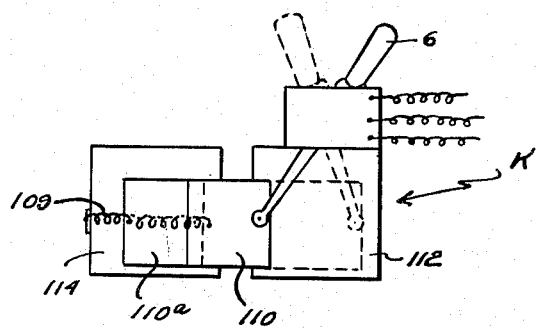
FIG. 8
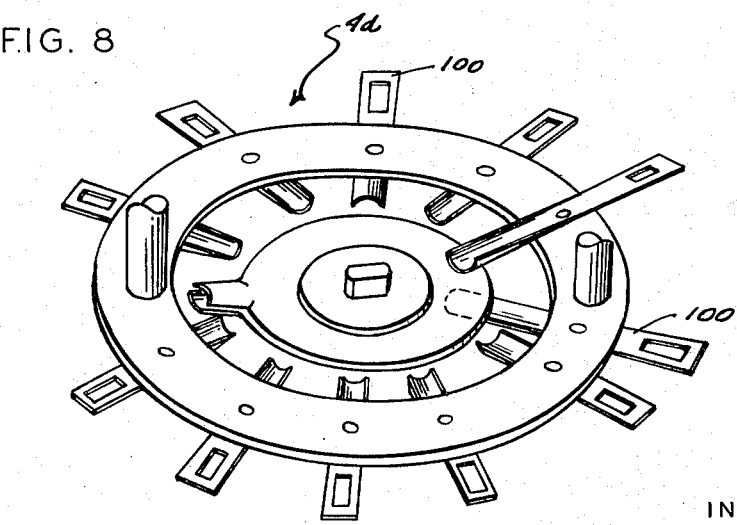
INVENTOR
Emil S. Wieszeck
BY
ATTORNEY

United States Patent Office 3,194,073
Patented July 13, 1965

3,194,073
MULTIMETER METERING APPARATUS
Emil S. Wieszeck, Box 175, Salem, N.H.
Filed June 2, 1961, Ser. No. 114,552
5 Claims. (Cl. 73—359)

This application forms a continuation-in-part of my copending application Serial No. 735,337 filed May 14, 1958.

This invention relates to improved methods and apparatus for measuring both electrical quantities and temperature determinations wherein a single moving coil is employed. The single moving coil is utilized interchangeably in both extremely sensitive low voltage range to denote temperature and in another higher voltage range to measure electrical values such as volts, current and resistance. The single moving coil is combined in a unique manner with a dual circuitry feature which avoids error due to thermal effects where a single coil is used. The single coil and its magnet is further combined with a novel magnet keeper device which is capable of being used in two positions, one of which permits greatest meter sensitivity for measuring temperatures.

Single instruments adapted to measure a variety of kinds and magnitudes of electrical quantities are known as multi-purpose meters or, as hereinafter referred to in the specification, as "multimeters." Such meters in general employ galvanometer means for all measurements, the electrical quantity to be measured being converted into the current range of the galvanometer by suitable circuitry and switching means. Electrical characteristics commonly measurable with a multimeter include voltage, current, and resistance. Capacitive and inductive reactance can also be measured with some meters. It has been proposed to use two opposed coils as disclosed in Umezawa 1,652,917. This arrangement requires that current flow through two coils arranged so that one opposes the other. This has not proven to be satisfactory and so far as I am aware there is at the present time no device available to perform the function noted above.

Multimeters of the prior art, however, have been generally unsuitable for measurement of temperature as characterized by the thermal electromotive force of a thermocouple. For one, galvanometer movements adequate for multimeter functions will generally lack sufficient sensitivity for accurate measurement of currents so small as those available from a thermocouple. But even providing a galvanometer of sufficient sensitivity, a more basic difficulty remains; that of providing a reference junction for the thermocouple. For, as is well known, the electromotive force obtained for temperature measurement characterizes the difference in temperature between a measuring and a reference junction. In lieu of temperature control on the reference junction, which is hardly feasible in a portable meter, the zero of the scale may be shifted to compensate for variations in ambient temperature. The usual galvanometer zero adjustment by orientation of the terminus of its restoring spring has been accomplished automatically in direct reading thermocouple galvanometers of the prior art by so orienting with a bimetallic thermal motor, or strip. But displacing the needle zero for its pyrometer function would defeat the remaining functions of a multimeter by throwing these out of adjustment.

My invention includes a practical solution to these difficulties. In one of its embodiments, I provide an automatic positioning adjustment of a temperature scale with respect to the other scales of the multimeter. In this way the movement of the galvanometer need not be tampered with once an initial zero adjustment has been established. I accomplish scale adjustment by a unique arrangement of bimetallic strips providing a suitable arcuate motion of the end connected to the scale.

It is thus an object of my invention to improve metering and test equipment of the class described by including in such apparatus means for measuring temperature.

Another object of my invention is to provide a portable multimeter with electrical circuits for measuring temperature changes as detected by means of various types of industrial pyrometers.

Still a further object of my invention is to combine a pyrometer type temperature measuring device with a multimeter in a manner such that two types of measuring functions may be carried out interchangeably and without interference therebetween.

Another object of my invention is the provision of an automatic reference-junction temperature compensator which does not disturb the usual functions of the multimeter.

Still another object of my invention is the provision of thermal isolation of a reference junction in the environment of the automatic cold junction temperature compensator.

Still another object is to devise a single moving coil type meter which may be used in a very low voltage range for sensitive readings of temperature and which may be shifted into another operating range for measuring electrical values of conventional nature.

These and other objects and novel features will be more fully understood and appreciated from the following description of preferred embodiments of the invention selected for purposes of illustration and shown in the accompanying drawings, in which:

FIG. 6 is a perspective view of a magnet and magnet keeper arrangement employed in the meter of the invention;

FIG. 7 is an elevational view further illustrating the magnet and keeper arrangement of FIG. 6, and particularly illustrating two positions of adjustment of the keeper member with respect to the magnet; and FIG. 8 is a detail perspective view illustrating a portion of an electrical switch construction shown in the circuit diagram of FIG. 4.

Figure 5:
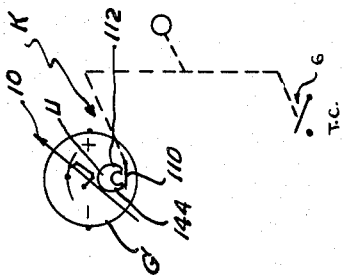
FIG. 5 is a diagrammatic view illustrating a switch and control mechanism therefor.

The present invention is based upon the novel concept of combining in a single multimeter device a special thermocouple sensitive circuit which may be operated with a selectively controlled single coil galvanometer and which is furnished with an adjustable magnet keeper apparatus shown in detail in FIGS. 5 and 7 and generally denoted by the arrow K. The single coil when thus combined with a magnet keeper is not only capable of sensing electrical quantities normally measured with standard type multimeters, but is adapted to provide accurate response to the extremely minute voltage and current flow produced in a thermocouple. The thermocouple sensitive circuit comprises one of two branches arranged in parallel. The thermocouple circuit branch is a constantan wire, and the other branch is a copper wire.

Referring more in detail to the structure shown in the drawing, numeral 1 (FIG. 1) denotes a portable meter case which may be formed of plastic or other suitable material. Detachably secured to the case is a front panel 2 on which is mounted a galvanometer G (FIG. 4) of the type having a permanent magnet keeper and moving coil. Associated with the galvanometer is a scale pan 3, best shown in FIG. 1. The scale pan presents a dial face having a plurality of scales located thereon, one of which may be a temperature scale.

An indicator arm 10 is attached to the galvanometer moving coil and is arranged to overlay all of various scales 3. This indicator arm 10 is provided with a zero corrector screw Z for alignment of the arm with the scale zero. Also located on the front panel of the casing is a range selector switch 4 and a basic circuit selector switch 5. The switch 4 may, for example, consist of a common 4-gang switch, the four constituent sections of which are indicated separately in the wiring diagram (FIG. 4) and denoted as switches 4A, 4B, 4C and 4D. The switches are interconnected so that when the selector knob of the switch 4 is rotated to any position, all of the arms including movable arm W on section 4A of range switch 4, movable arm X of section 4B, movable arm Y of section 4C and movable arm Z of section 4D assume that position in their respective sections of switch 4. At the side of the casing is a toggle switch 6, more fully described hereinafter, and at the front of the panel are terminals as 7 and 8, 7a and 8a, and 7b and 8b.

Attached to the interior side of the front wall of case 1 are various electrical components including batteries, switches, and resistors. These together with proper electrical circuitry connecting them to the galvanometer G (FIG. 4) toggle switch 6 and magnet keeper K, constitute the various measuring circuits of the conventional multimeter.

In accordance with the invention, I include a special thermocouple circuit portion (FIG. 4) which is associated with the conventional portions of the circuits in such a way that the special thermocouple circuit portion is under the control of the switches 4 and 5 while the magnet keeper device is under the control of the toggle switch.

Figure 4:
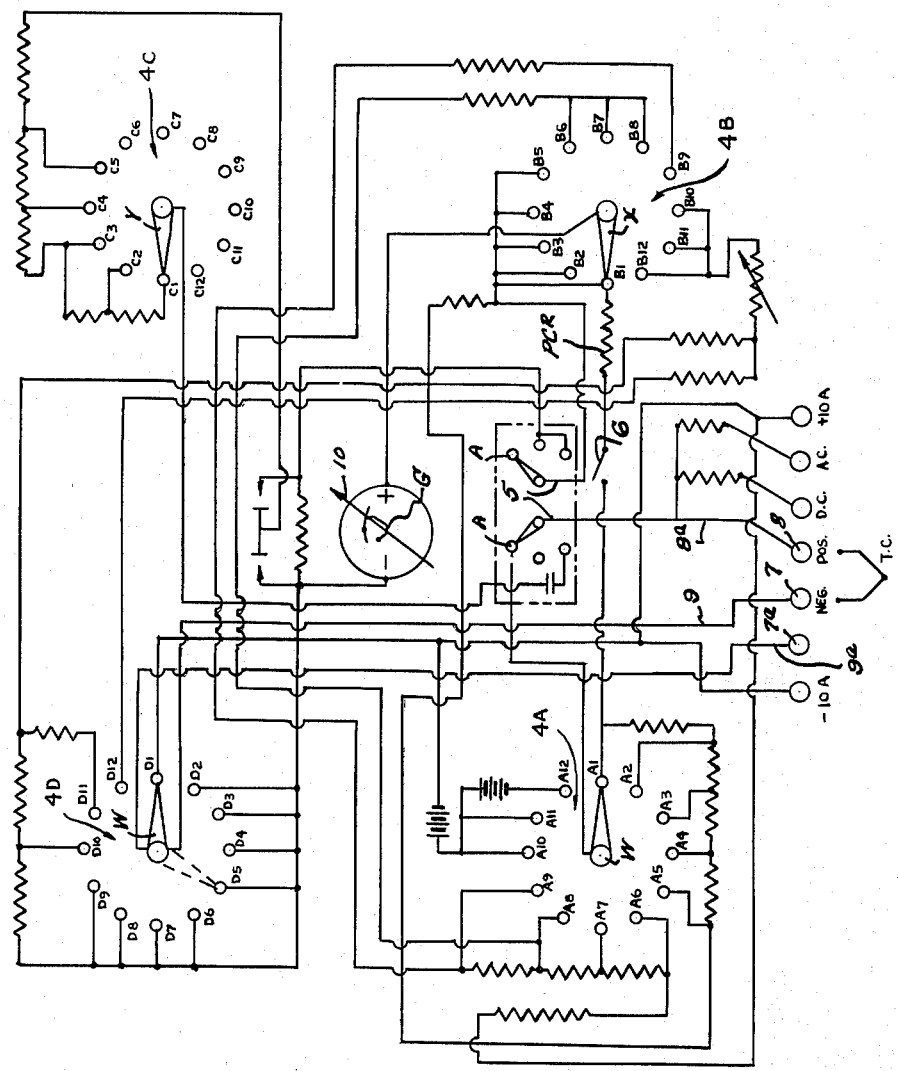
FIG. 4 is a circuit diagram illustrating a preferred embodiment of circuit arrangement of the invention for combining both electrical measuring means and compensated temperature measuring means in one piece of apparatus.

This special thermocouple circuit portion has one terminal 8, and one wire 8a running from the positive side of the cold junction, and two terminals 7 and 7a, and two separate wires 9 and 9a running from the negative side of the cold junction to switch 4D as shown in FIG. 4. The wire 9 running from terminal 7 is constantan wire, and the wire 9a running from the terminal 7a is copper.

I also construct the member D1 of constantan and it is designed to make contact with the underside of movable arm Z. All of the other D terminals make contact with the upper side of arm Z. The contact arm Z is of bimetallic construction having constantan at its bottom side and copper at its upper side so as to operate with the rotary switch 4D as is more clearly illustrated in FIG. 8. In the latter figure numeral 100 is constantan and the common contact 102 is constantan with all of the remaining contacts being copper. Switch 4 has one wafer whose "common" terminal is not common to other circuits. When the toggle switch 6 is open, the thermocouple circuit cannot operate and any one of the other measuring circuits numbered 2–12, inclusive, can be placed in an operative position, depending upon the various positions of switches 4 and 5. The closing of switch 6 provides a desirable isolation of the positive cold junction 8 from the meter circuit. In this way it is not possible for an external connection from terminal 8 to ground or to any other voltage source to affect the meter reading by way of terminal 4B1. Switch 4D1 isolates the negative terminal 7.

When the present meter is to be used for temperature measurement, the thermocouple test prods for a pyrometer are attached to the terminals 7 and 8. Thus, with switch 6 closed, range switch 4 set to position 1, basic circuit selector switch 5 set to position A, all as shown in FIG. 4, a pyrometer circuit is completed which permits temperature to be measured as the deflection of galvanometer 3.

When the welded hot junction of the thermocouple assumes a temperature different from its cold junction, a direct current will flow across any electrical conductor placed across the cold ends of the thermocouple. In accordance with the invention, that electrical conductor is comprised by my galvanometer G with its keeper and its associated thermocouple circuitry described above and shown in the circuit diagram of FIG. 4, in combination with the various switches and other components noted. Essentially these components include, for the thermocouple circuit the circuit selector switch 5, range switch 4, toggle switch 6, special pyrometer compensating resistor PCR, terminals 7 and 8, and appropriate conductive wire connecting these various components to one another, as shown in FIG. 4. In this circuit, a direct current from the thermocouple attached at the terminals 7 and 8 will flow into meter terminal 8, through position A of circuit selector switch 5 and section 4A of range switch 4 through the movable common contact arm W then out through terminal A–1, through toggle switch 6, through resistor PCR. The current flow from the measuring thermocouple TC continues in series through the resistor PCR, then through movable common arm X of switch section 4B to the positive terminal 3a of the meter 3; out the negative terminal 9 after moving the meter pointer 10; then out through the return lead Z; and then directly to the negative terminal 7 and to the negative leg of the thermocouple, thus completing the circuit.

The pyrometer compensating resistor PCR is selected to provide proper sensitivity of the meter arm 10 in registry with the temperature scale for whatever thermocouple metals happen to be chosen to cover a given temperature range. Different resistor values may be required for different thermocouple materials.

A novel feature of the invention is the location of the pyrometer compensating resistor PCR, as shown in FIG. 4, between position 1 of section 4A and 4B of the range selector switch 4 in conjunction with the location of the toggle switch 6 between the resistor PCR and terminal 1 of range switch 4A. This arrangement enables the thermocouple or pyrometer circuit described to be either connected or separated from the other multimeter circuits. When separated the pyrometer compensating resistor PCR cannot interefere with the efficiency and functioning of the various multimeter circuits.

Figure 1:
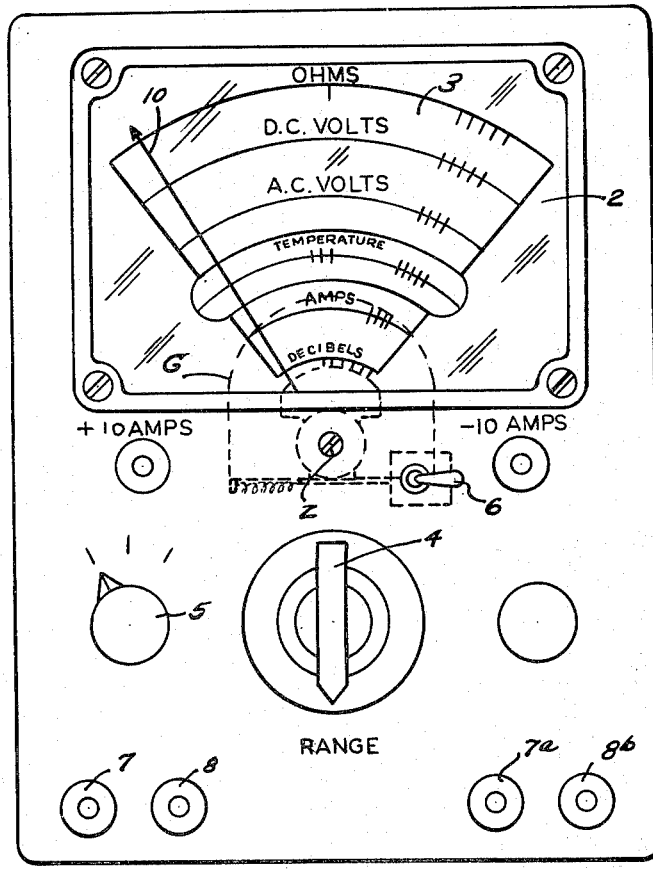
FIG. 1 is an elevational view of the meter and its dial as viewed from the front side thereof.

Another novel feature of the invention is the adjustable magnet keeper device K which provides for an automatic meter characteristic change as well as range change when toggle switch 6 is moved from an open position to a closed position. The magnet keeper device is shown in detail in FIGS. 6 and 7 and as indicated therein includes a magnet U which is of the type having a moving coil therein. The coil and indicator 10 are shown in FIGS. 1 and 4 and are generally denoted by G. In FIGS. 6 and 7 the coil G is removed to show the air-gap between the poles 112 and 114 of magnet U.

A keeper 110 of soft iron has attached thereto a brass extension 110a and the end of the brass portion 110a is resiliently secured by a spring 109 for sliding movement across the pole pieces 112 and 114. Pivotally attached to the soft iron portion 110 is an extension of toggle switch 6 whereby moving the toggle switch slides the soft iron keeper part 110 over onto the pole face 112 into a position such that the brass copper portion 110a lies across the pole faces 112 and 114. The extension of toggle switch 6 has been indicated diagrammatically in FIG. 5 and it will be observed that by moving the toggle switch 6 the iron portion of the keeper may be positioned to close the gap of the magnet whereas in another position of the toggle switch, as suggested in dotted lines in FIG. 7, the brass portion of the keeper may close the air-gap.

By means of this arrangement I am enabled to provide maximum meter stability and longevity under all conditions of use such as A.C. and D.C. measurements. This novel keeper arrangement reduces the deflection of my meter pointer when it is across the magnet pole pieces. Hence, I have calibrated the various circuits of the multimeter to read correctly with the keeper across the pole pieces. By means of the toggle switch 6 I am able to simultaneously change from the volt-current circuits of the multimeter with the temperature measuring circuit.

The temperature measuring circuit, as now described, may be employed without regard for compensation for temperature changes which may take place at the reference junctions 7 and 8. In such case, the temperature scale of FIG. 1 may appear on the same dial with the other scales. However, in accordance with an important aspect of the invention, I provide a means for compensating for temperature change at the cold junction of the thermocouple which will necessarily assume the temperature ambient to the meter box. For general usage the meter box temperature may vary over a wide range, as for example, from below freezing temperatures in exposed areas in the winter to above 100° F. in the closed spaces near large furnaces. To neglect to compensate for ambient temperature changes as large as 100° F. is to limit the pyrometer accuracy to a magnitude as great as this change.

It is well known that cold compensation may be accomplished by attaching a bimetallic spiral to one of the coil springs of a meter so that the bimetallic spiral, as it moves with temperature change, may reposition the indicator hand or pointer. This system, however, cannot be employed in conjunction with a multimeter where many different meter and circuit combinations require a fixed, mechanical, meter zero position so that the meter pointer will always indicate zero when there is no voltage or current. If the bimetallic spiral were attached to the meter hair-spring, the meter pointer would constantly be in motion along the scale in accordance with ambient temperature changes.

Figures 2, 3:
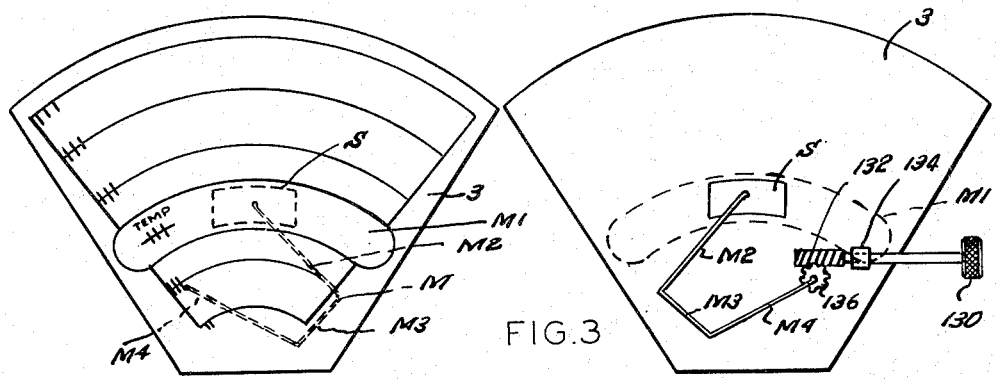
FIG. 2 is a detail elevational view of a compensated form of dial arrangement which may be employed in the meter of the invention.
FIG. 3 is another detail elevational view of a compensated form of dial further illustrating adjustment mechanism therefor.

To overcome this difficulty, I permit the meter pointer zero to remain stationary, moving instead the temperature scale segment M'. I accomplish this movement with a bimetallic element M which is mounted on scale pan 3 and attached to special scale segment M' which carries temperature markings as shown in FIGS. 2 and 3 and is movable independently of the remainder of the multimeter scale pan. Such an arrangement enables me to reposition the scale segment M' with respect to the indicating hand or pointer 10 without disturbing the remaining meter circuit characteristics in any way. Hence, the meter indicator hand 10 will return to zero on voltage and current scales such as those shown in FIG. 1 after any temperature measurement.

In a preferred embodiment of my compensating mechanism, as shown in FIGS. 2 and 3, the temperature scale is moved a predetermined distance relative to its supporting scale pan and to all of the other scales on the dial, such movement being dependent upon temperature changes at the cold junction of the thermocouple. In general, I accomplish this movement and its resulting cold compensation by attaching to the underside of the multimeter scale pan 3 a bimetal control member M3 that is capable of moving the temperature scale M' along an arcuate path. The temperature-wise sensitivity of scale movement is made to correspond to the average sensitivity of the meter in the range around the expected ambient temperature. Thus the zero mark of the other multimeter scales will correspond to ambient temperature on the pyrometer scale. I also provide a cold end calibration screw 130 which extends through the meter casing as shown in FIGS. 1 and 3 and which supports a worm 132 rotatable in a bearing 134. The worm drives a gear 136 secured to the anchored end of member M.

Considering the bimetallic member M of the invention in greater detail, I provide in the scale pan 3 an arcuate slot S. One end of my bimetallic member M comprises a foot portion M2 composed of two metal elements of different coefficients of expansion and attached at one end to the arcuate segment M', as shown in FIGS. 2 and 3. The foot portion M2 extends through the slot S and joins with a leg portion M3 projecting substantially at a right angle to the foot portion M2. This leg portion M3 is also composed of two metal elements of different coefficients of expansion and it joins with a second bimetallic foot portion M4 comprising still another pair of bimetallic elements of different coefficients of expansion. The foot portion M4 also projects at approximately a right angle to the end of the leg portion M3.

It is pointed out that the arrangement of these bimetallic portions is so chosen that all of the portion lie in a plane substantially parallel to the dial face. I further construct these bimetallic elements so that the bimetallic components of the leg portions M3 are secured together to provide a curling or bowing effect opposite to that of the foot portions M2 and M4. As a result of this, the leg portion M3 will tend to deflect in one direction and the foot portions M2 and M4 will tend to deflect in the opposite direction. This construction is similar to that employed in my patent application Serial No. 236,727 filed July 14, 1951, and now Patent No. 2,716,343 where it is more fully described.

In operation, assume that a thermocouple TC is connected to the meter as suggested diagrammatically in FIG. 4 and that the cold junction CJ of the thermocouple at the outer panel portion of the meter is subject to a temperature change, then the compensating mechanism operates in the following manner. The leg portion M3 curls or bows in one direction while the upper foot portion M2 curls or bows in an opposite direction, correcting for the tipping or bending of the leg portion M3. The lower foot portion M2 curls or bows in an opposite direction, correcting for the tipping or bending of the leg portion M3. The lower foot portion M4, with its extremity fixed to the scale pan, also curls or bows in the same direction as foot portion M2, so as to produce a movement following the arcuate path of the scale segment. Since the scale end of the bimetal tends naturally to follow the path to which the scale M1 is constrained, the bimetal does not tend to bind the scale. The direct attachment of the bimetal ends without additional linkage enhances the ruggedness and reliability of the compensating means. If desired, various other combinations of bimetallic members may be used in the same general manner.

The drawings illustrate a preferred embodiment of the invention, showing a type of test equipment suitable for general laboratory use and for industrial equipment maintenance, although it should be understood that the invention may take various other forms and may be used with almost any kind of circuit or circuit arrangement. In this connection, it will be appreciated that many kinds of thermocouples and temperature ranges may be employed. For example, in the embodiment of the invention heretofore described in detail, a temperature range of from 0 up to 2,600° F. is provided for by use of a Chromel Alumel thermocouple. Such a temperature range will be useful for such functions as tempering and drawing operations in heat treating of metals and pouring temperatures of non-ferrous alloys and metals such as brasses and aluminum.

Various other changes and modifications may be resorted to in keeping with the scope of the invention as defined by the appended claims.

I claim:

1. In a multimeter having a plurality of concentrically arranged indicating scales including a temperature measuring scale and an electric measuring scale, and an indicator arm movable across said scales and having a plurality of metering circuits for measuring electric values, and a galvanometer with a coil for actuating the indicator arm, a thermocouple, a temperature measuring circuit for receiving electrical signals from the thermocouple and conducting said signals to the coil of the galvanometer, a resistor for the temperature measuring circuit, switch means for connecting the resistor with the galvanometer coil, said galvanometer, temperature measuring circuit and resistor being responsive to a thermocouple induced current input of relatively low voltage characteristics to produce an independent deflection of the said indicator arm across a range of temperature values on the temperature measuring scale and through an arc of travel which corresponds in magnitude substantially to the arc of travel of the indicator arm which can be induced by any one of the current inputs of the electrical metering circuits, and said temperature measuring circuit including a constantan wire branch and a copper wire branch and means for selectively utilizing the constantan wire branch when measuring a thermocouple signal thereby to avoid transmission of thermal effects to the copper conductor portions of the circuit.

2. The structure of claim 1 in which said selectively utilizing means includes a gang switch interposed in both said temperature-measuring circuit and said electrical metering circuit, said gang switch having a contact arm for interconnection into said temperature-measuring circuit, with said gang arm having constantan on one side and copper on the other side.

3. The structure of claim 1 in which said galvanometer includes a permanent magnet equipped with a switch-actuated keeper for reducing the deflection of said indicator arm when said electrical metering circuits are employed.

4. A multimeter, comprising:
   a casing,
   a galvanometer mounted in said casing and including a single wire coil and indicator arm actuatable by said coil,
   a fixed dial face in said casing providing a background for said indicator arm, said dial face having a plurality of scales for electrical values and concentrically arranged thereon with radially aligned zero points,
   a movable scale for temperature mounted in said casing also serving as a background for said indicator arm and concentrically related to said electrical value scale,
   a thermally expansible element connecting said movable scale to said casing to align the point of said movable scale representing the casing internal temperature with said radially aligned zero points whereby a change in internal temperature of said casing changes the position of said movable scale relative to said radially aligned zero points,
   a thermocouple circuit connected to said galvanometer coil and including a hot junction remote from said casing and a cold junction within said casing, said thermocouple circuit including within said casing a resistance-equipped copper branch and a second branch constructed of a metal other than copper, said metal being compatible with copper and the thermocouple metals to avoid transmission of thermal effects to said copper branch, and
   an electrical value circuit connected to said galvanometer coil and being relatively insensitive to current flow as compared to said thermocouple circuit.

5. The structure of claim 4 in which said multimeter includes a selective switch interposed in both said thermocouple circuit and said electrical value circuit, terminals being provided on said casing for both of said circuits, said resistance being interposed between the positive terminal of said thermocouple circuit and said selector switch.

References Cited by the Examiner

UNITED STATES PATENTS

| | | | |
|---|---|---|---|
| 1,176,362 | 3/16 | Gollmer | 73—359 |
| 1,652,917 | 12/27 | Umezawa | 73—362 |
| 1,972,146 | 9/38 | Johnson | 73—359 |
| 2,716,343 | 8/55 | Wieszeck | 73—363.5 |
| 2,893,830 | 7/59 | Brixner | 252—62.5 X |

OTHER REFERENCES

Catalog, Allied Radio, Chicago, No. 170, 1958, page 244.

ISAAC LISANN, *Primary Examiner.*